(12) United States Patent
Eckert

(10) Patent No.: US 9,195,618 B2
(45) Date of Patent: Nov. 24, 2015

(54) METHOD AND SYSTEM FOR SCHEDULING MEMORY REQUESTS

(75) Inventor: Roger Eckert, San Jose, CA (US)

(73) Assignee: NVIDIA CORPORATION, Santa Clara, CA (US)

(*) Notice: Subject to any disclaimer, the term of this patent is extended or adjusted under 35 U.S.C. 154(b) by 1035 days.

(21) Appl. No.: 12/485,769

(22) Filed: Jun. 16, 2009

(65) Prior Publication Data

US 2010/0318750 A1    Dec. 16, 2010

(51) Int. Cl.
G06F 12/00 (2006.01)
G06F 13/00 (2006.01)
G06F 13/28 (2006.01)
G06F 13/16 (2006.01)

(52) U.S. Cl.
CPC ....................... *G06F 13/16* (2013.01)

(58) Field of Classification Search
CPC ........................................ G06F 13/16
USPC .................... 711/151, 105, E12.001
See application file for complete search history.

(56) References Cited

U.S. PATENT DOCUMENTS

| | | | |
|---|---|---|---|
| 4,807,111 A * | 2/1989 | Cohen et al. | 710/54 |
| 6,330,583 B1 | 12/2001 | Reiffin | |
| 6,647,456 B1 * | 11/2003 | Van Dyke et al. | 711/105 |
| 7,376,803 B1 * | 5/2008 | Eckert | 711/158 |
| 7,617,368 B2 * | 11/2009 | Van Dyke et al. | 711/156 |
| 2003/0065843 A1 * | 4/2003 | Jones et al. | 710/107 |
| 2003/0067832 A1 * | 4/2003 | Emmot et al. | 365/230.03 |
| 2004/0268355 A1 | 12/2004 | Robin et al. | |
| 2006/0288346 A1 | 12/2006 | Santos et al. | |
| 2009/0228663 A1 * | 9/2009 | Ichino | 711/148 |
| 2011/0212761 A1 | 9/2011 | Paulsen et al. | |

* cited by examiner

*Primary Examiner* — Sheng-Jen Tsai

(57) ABSTRACT

A system for selecting memory requests. The system includes arbiters and a time ordered list scheduler. Each arbiter selects a memory request for transmission from at least one client. The scheduler is operable to receive and store memory requests from the arbiters and selects a selected memory request for forwarding to a memory system. The scheduler includes a list structure operable to store memory requests received from the arbiters in a fashion to preserve relative time of arrival of the memory requests. The scheduler includes scanners that are prioritized with respect to one another. Scanners are operable to simultaneously scan contents of the list structure from the oldest to newest requests and determine whether a memory request match is found based on associated programmable rules to locate a memory request candidate. A memory request candidate of a highest priority scanner is selected by the scheduler as the selected memory request.

21 Claims, 6 Drawing Sheets

METHOD AND SYSTEM FOR SCHEDULING MEMORY REQUESTS

TECHNICAL FIELD

The embodiments of the present invention relate to the field of electronics. More particularly, embodiments relate to scheduling memory requests.

BACKGROUND ART

In recent years, memory latency has become a major concern in computing. For example, memory latency affects the response time of electronic components, such as displays and videos. Memory latency also impacts the die area expended on latency buffers.

Many electronic systems require certain timing requirements to be maintained with respect to memory subsystems. For example, a dynamic random access memory (DRAM) requires certain timing such as read/write cycle time, access time, pre-charge time, page mode read/write cycle, etc. By issuing memory requests in particular orders, these timing requirements can be maintained while increasing the efficiency of the memory subsystem. By increasing the efficiency, bandwidth increases. However, if the arbiter focuses too heavily on increasing bandwidth, latency may increase as some requests are being bypassed too long as more efficient requests are being processed.

Also, if the arbiter focuses too heavily on latency, then memory requests may be sent to the memory subsystem in sequences that do not provide for efficient use of the memory subsystem, thereby decreasing bandwidth.

Accordingly, better arbiters are needed to address the trade-off between memory latency and memory bandwidth.

SUMMARY

Accordingly, a need has arisen to reduce memory latency while increasing memory bandwidth. Furthermore, a need has arisen to provide a memory request scheduler device that can reduce memory latency while increasing memory bandwidth with minimal complexity and die surface area. It will become apparent to those skilled in the art after reading the detailed description of the present invention that the embodiments of the present invention satisfy the above mentioned needs.

According to one embodiment of the present invention, a system for selecting memory requests is disclosed. In one embodiment, the system includes a plurality of arbiters and a novel time ordered list scheduler. Each arbiter receives memory requests from multiple clients and selects at least one memory request for transmission to the scheduler. The scheduler receives and stores the memory requests from the plurality of arbiters, multiple requests may be sent to the scheduler at the same time. The scheduler selects a memory request for forwarding to a memory system, e.g., a dynamic random access memory (DRAM) controller and a DRAM.

A list structure of the time ordered list scheduler is operable to store the plurality of memory requests received from the plurality of arbiters in a fashion that maintains the relative arrival time of the requests, e.g., from a bottom vacant location upward. As a result, memory requests in the lower portion of the list structure represent older memory requests while memory requests in the upper portion of the list structure represent newer memory requests. After a request is removed from the list structure, all remaining requests that sit above the removed request are moved down by one position within the list structure. In an alternative embodiment, the relative arrival time of the stored requests are maintained by a linked list within the entries of the list structure rather than the above described bottom to top approach.

A plurality of scanners that are prioritized with respect to one another simultaneously scan contents of the list structure from the oldest request to the newest request, e.g., from the bottom up. Based on associated programmable rules, each of the plurality of scanners determines whether a match is found in the list structure. The scanners can be programmed independently and locate at most one match per search. A memory request associated with a found match for a scanner becomes a memory request candidate. Some scanners may provide no candidates depending on the scan. The highest priority scanner having a memory request candidate is selected by the scheduler as the selected memory request. The selected memory request is removed from the list structure and transmitted to the memory subsystem. Memory requests above the selected memory request in the list structure are then shifted downward to fill the vacancy created by the removal. A new memory request is received and stored into the list structure to fill the vacancy created by the shift and the process continues. In an alternative embodiment, the scanners scan from the oldest request to the newest request by following a link list maintained by the list structure.

More particularly, a system for selecting memory requests includes a plurality of arbiters and a scheduler. Each arbiter is operable to select at least one memory request for transmission from at least one client. This may be performed using a round-robin fashion. The scheduler is for receiving and storing a plurality of memory requests from the plurality of arbiters and for selecting a selected memory request for forwarding to a memory system.

According to one embodiment, the scheduler includes a list structure and a plurality of scanners. The list structure is operable to store the plurality of memory requests received from the plurality of arbiters in a fashion to maintain the relative arrival time of the requests, e.g., from a bottom most vacant location upwards. The scanners of the plurality of scanners are prioritized with respect to one another, wherein each scanner is operable to simultaneously scan contents of the list structure from oldest request to the newest request, e.g., from the bottom up. Each of the plurality of scanners determine whether a memory request match is found based on associated programmable rules to locate a memory request candidate, wherein a memory request candidate of a highest priority scanner is selected by the scheduler as the selected memory request.

In one embodiment, the scheduler further includes a plurality of counters each associated with a memory request. A counter associated with memory request is updated each time the associated memory request is bypassed, e.g., a newer memory request is selected over it. According to one embodiment, a memory request associated with a counter reaching a threshold value is flagged by the scheduler and scanners can be programmed to detect this. Memory requests from each client may have their own bypass threshold associated therewith.

According to one embodiment, the scheduler further includes a history register operable to store information associated with a previously selected memory request. The information is provided to the plurality of scanners for their selection process.

In one embodiment, the programmable rules may include a client type request, a threshold value for the number of times a memory request is allowed to be bypassed without being selected by the scheduler, a read/write direction, row matching currently open row, a last issuing bank, and a least recently used bank. The plurality of arbiters may include any well known type, such as a ring arbiter, a round-robin arbiter, etc.

It is appreciated that in one embodiment, content associated with the selected memory request is removed from the list structure and memory requests located in entries that lie above the entry associated with the selected memory request are shifted downward. According to one embodiment, the scheduler further includes a multiplexer operable to select the memory request candidate of the highest priority scanner as the selected memory request.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
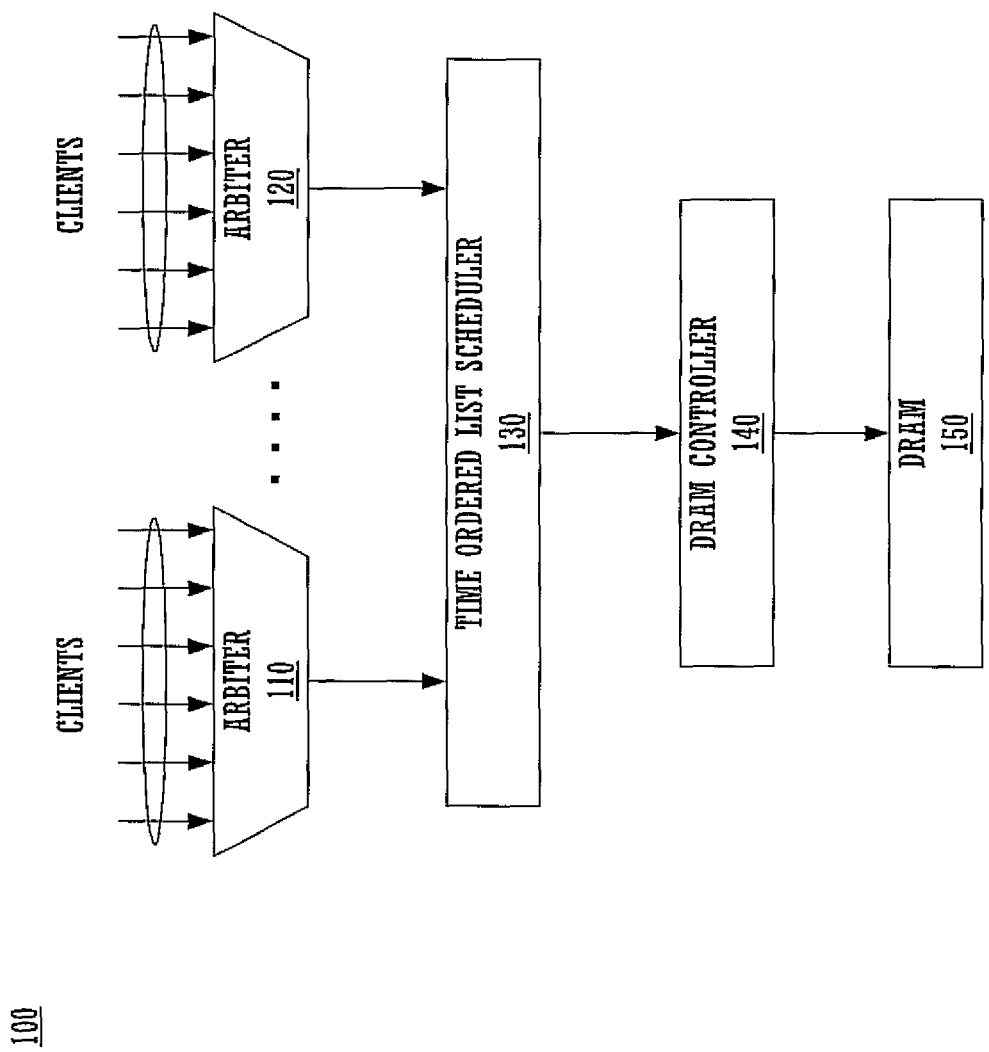
FIG. 1 shows a system for selecting memory requests in accordance with one embodiment of the present invention.

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be evident to one of ordinary skill in the art that the present invention may be practiced without these specific details. In other instances, well known methods, procedures, components, and circuits have not been described in detail as not to unnecessarily obscure aspects of the invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the art to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "creating" or "transferring" or "executing" or "determining" or "instructing" or "issuing" or "clearing" or "accessing" or "obtaining" or "selecting" or "calculating" or "measuring" or "querying" or "receiving" or "sending" or "providing" or "storing" or "incrementing" or "ordering" or "transmitting" or "scanning" or "unloading" or "incrementing" or "shifting" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Method and System for Scheduling Memory Requests

Referring to FIG. 1, a system 100 for selecting memory requests in accordance with one embodiment of the present invention is shown. The system includes multiple arbiters, e.g., 110 and 120. Arbiters 110 and 120 each receive memory requests from multiple clients. The arbiters 110 and 120 are coupled to a time ordered list scheduler 130 in accordance with the present invention. The time ordered list scheduler 130 is coupled to a dynamic random access memory (DRAM) controller 140 for controlling a DRAM 150. The time ordered list scheduler 130 receives and stores memory requests from the arbiters 110 and 120. Moreover, the time ordered list scheduler 130 selects a memory request to be forwarded to the DRAM controller 140.

Figure 2:
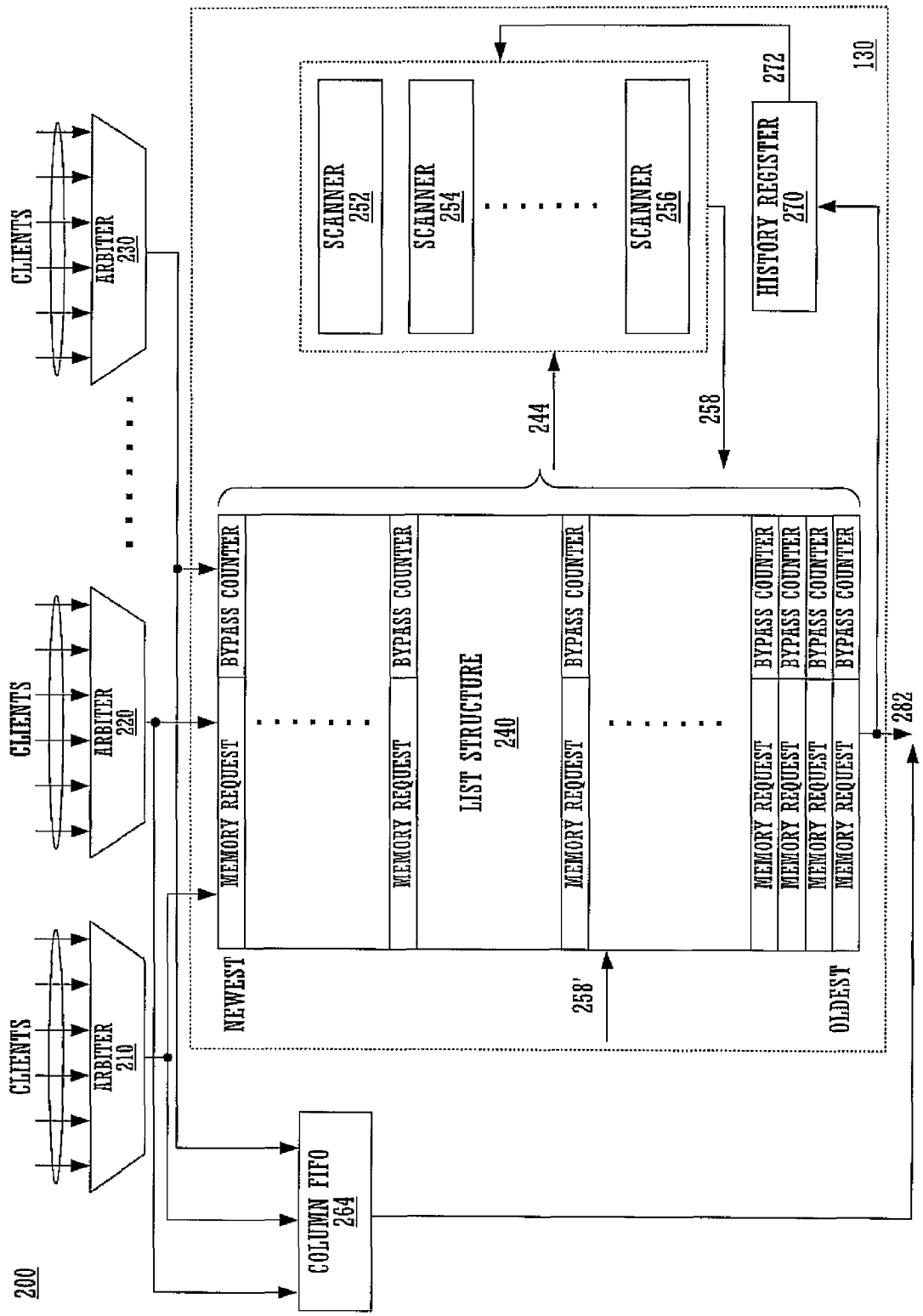
FIG. 2 shows a system including a time ordered list scheduler for selecting memory requests in accordance with one embodiment of the present invention.
Figure 3A:
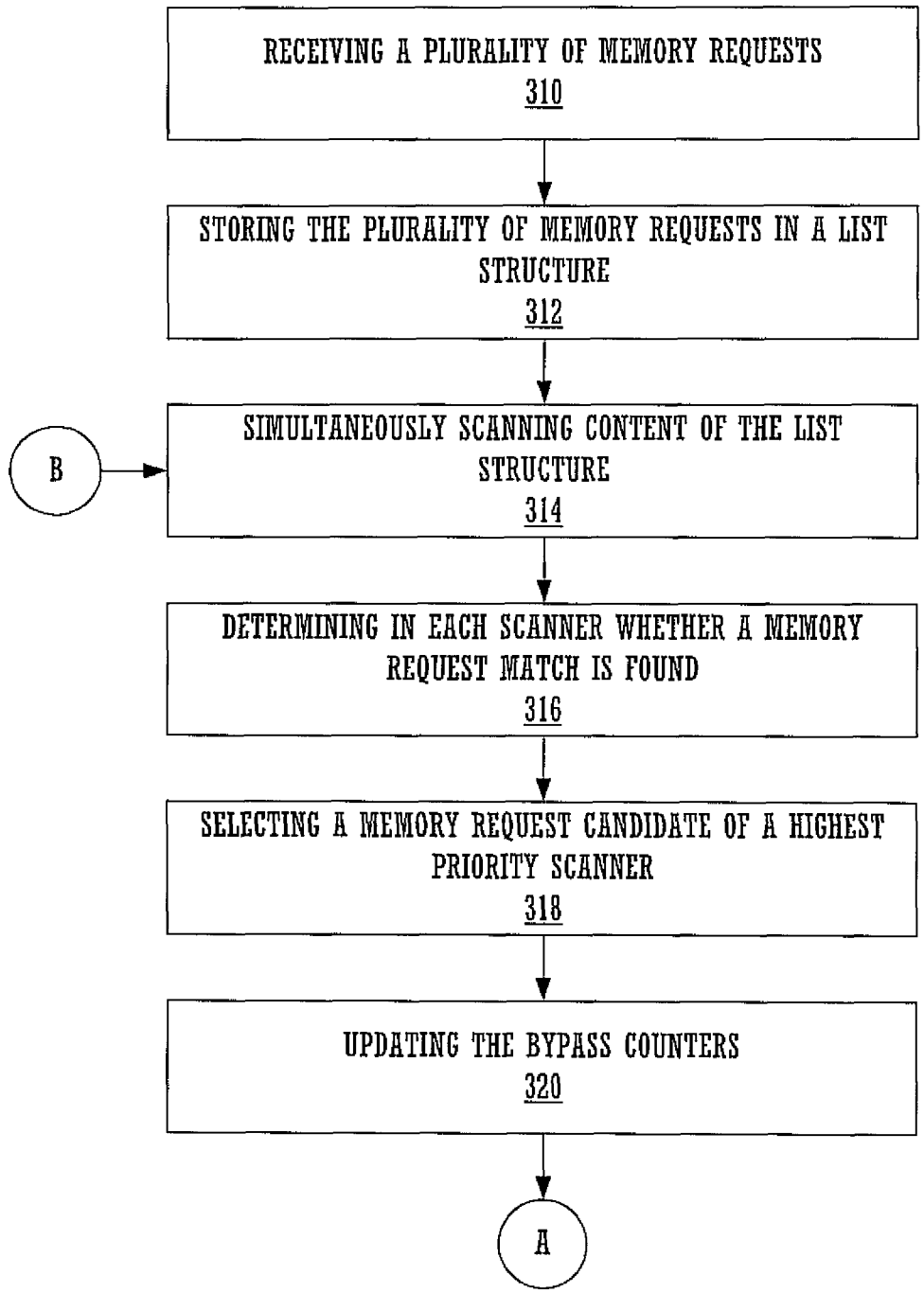
FIGS. 3A and 3B show a flow diagram for selecting memory requests in accordance with one embodiment of the present invention.

Referring now to FIG. 2, a system 200 including the time ordered list scheduler 130 for selecting memory requests in accordance with one embodiment of the present invention is shown. It is appreciated that the number of arbiters may vary. For example, system 200 includes three arbiters 210, 220, and 230 unlike system 100 that includes two arbiters. The arbiters are coupled to supply memory requests to the scheduler 130. The scheduler 130 includes a list structure 240. The list structure 240 is coupled to a plurality of programmable scanners, e.g., 252, 254, and 256. The plurality of scanners is coupled to a history register 270. The arbiters 210, 220, and 230 are further coupled to a column FIFO 264 for storing portions of memory requests that are not needed by the time ordered list scheduler 130. Generally, as an optimization, only the portion of a memory request that is involved in the selection process need be stored in the list structure 240. Those portions of a request that do not contribute to the selection process, e.g., column address information, is stored in column FIFO 264. Each memory request stored in the list structure 240 contains a pointer to its associated data of the column FIFO 264. The system 200 is described in conjunction with its operation as shown in the flow diagram of FIG. 3.

Referring now to FIG. 3, a flow diagram 300 for selecting memory requests in accordance with one embodiment of the present invention is shown. At step 310, memory requests are transmitted by the arbiters 210, 220, and 230 and received by the list structure 240 and stored. In one embodiment, the arbiters include a time-oriented ring arbiter. It is appreciated that the arbiters may also include a round-robin arbiter. Arbiters 210-230 may be of any well know type and examples are given herein only for discussion.

According to one embodiment, a time-oriented ring arbiter takes a snapshot of all clients that are actively requesting. Once a snapshot is taken, the ring is closed until all client requests that were in the original snapshot have been granted. This tends to coarsely preserve the relative arrival time of the client requests, which helps to manage latency. For example, the snapshot taken by the arbiter 210 may indicate that there are three memory requests from three clients out of six clients. The arbiter 210 loads the three memory requests in at least three cycles. Other arbiters operate in similar fashion. Later, the arbiter takes another snap shot and repeats the process for next snapshot.

Using more than one arbiter in the system 200 is desirable because it is advantageous to fill up the list structure 240 as fast as possible. For example, using three arbiters 210, 220, and 230 will load three memory requests to the list structure 240 in each cycle. In comparison, using one arbiter only loads one memory request per cycle. As a result, the list structure 240 fills up faster when more arbiters are used. It is appreciated that taking snapshots and transmitting memory requests to the list structure 240 preserves the relative arrival time of memory requests for the same client and relative to other clients.

At step 312, the list structure 240 stores the received memory requests in a fashion that preserves the relative arrival time of the requests. It is appreciated that in one embodiment, the list structure 240 may store only a portion of memory requests that is needed by the time ordered list scheduler 130 to select a next memory request. For example, information stored by the list structure 240 may comprise a client type, a row associated with the memory request, a bank associated with the memory request, a read/write direction of the memory request, and a bypass threshold, etc. Portions of the memory requests that are not needed by the time ordered list scheduler 130 are stored in column FIFO 264 to preserve valuable die surface for the time ordered list scheduler 130. For example, column address information associated with memory requests are not needed by the time ordered list scheduler 130, and are therefore stored in the column FIFO 264.

It is appreciated that the initial counter value of a stored request is its bypass threshold that arrives with the request.

The received memory requests are stored in a fashion that preserves the relative arrival time of the requests, e.g., from a bottom most vacant location upwards within the slots of the list structure 240. As a result, the relative arrival time of memory requests are preserved. For example, the oldest memory request resides at the bottom location of the list structure 240. In comparison, the newest memory request resides at the top location of the list structure 240. The process repeats and the list structure 240 stores the memory requests until it is filled or substantially filled.

In an alternative embodiment, the relative arrival time of the stored requests can be maintained using a linked list within the list structure 240 rather than the above described bottom up method.

At step 314, the plurality of programmable scanners 252, 254, and 256 simultaneously scan contents of the list structure 240 from the oldest request to the newest request, e.g., from the bottom of the list structure 240 upwards to locate a match each. The scanners 252, 254, and 256 scan the content of the list structure 240 by accessing the content of the list structure 240 over bus 244. In an alternative embodiment, the scanners scan from oldest request to newest request by following the linked list described above.

It is appreciated that the number of scanners may vary and the number of scanners provided are exemplary and not intended to limit the scope of the present invention. Moreover, it is appreciated that the scanners are prioritized with respect to one another. For example, the scanner 252 may have a higher priority in comparison to the scanner 254 and the scanner 254 may have a higher priority in comparison to the scanner 256. Each scanner may be independently programmed to locate a match. Also, scanners do not necessarily locate a match on each scan.

At step 316, each of the scanners 252, 254, and 256 determines whether a memory request match is found. It is appreciated that each scanner has a set of programmable rules associated therewith. Accordingly, each scanner may search for a memory request match which may be different from other scanners. A scanner locates at most one match per scan scanning from the bottom of the list structure 240 upwards. The first match, e.g., the oldest request that matches the scanners programmable criteria, is always selected.

According to one embodiment, the programmable rules of a scanner may include a type of client request. For example, the rule may be whether the memory request is from an isochronous client. The programmable rules may also include a rule to determine whether a given memory request stored in the list structure 240 has not been selected (bypassed) for over a number of times. For example, memory requests that have been bypassed a number of times over a predetermined threshold may become flagged within the list structure 240. Scanners can be programmed to recognize this flag. A request is bypassed when a newer request is selected over that request. The programmable rule may also include whether a read/write direction of a memory request is the same as the direction of the last selected request.

It is appreciated that the programmable rules may further include a rule to determine whether a row for a memory request is the same as the row currently open. The rule may also include a rule to determine whether the memory request is from a same bank as the last issuing bank. In one embodiment, the rule may be to determine whether the bank is one of the least recently used banks. It is appreciated that the programmable rules are user programmable for each scanner and user selectable and may be programmed by the designer. In one embodiment, the rules exist as a number of selectable flags for which a scanner can be programmed to recognize.

In one embodiment, a programmer may construct a rule or a combination of rules for each scanner. As a result, each scanner scans the list structure 240 from the bottom up, e.g., oldest request to newest request, to determine whether a match exists based on the rules created and associated with each scanner. The very first memory request found as a match by a scanner is flagged as a memory request candidate. It is appreciated that a scanner may not find a match for a particular scan, in which case it will report no candidate match for that scan.

At step 318, the highest priority scanner having a memory request candidate is selected 258 as the output memory request. For example, assume scanners 252 and 256 may both find a memory request match candidate in the list structure 240 while the scanner 254 does not find a memory request match candidate. The memory request candidate from the scanner 252 is selected as the output memory request because the scanner 252 has a higher priority in comparison to the scanner 256. Scanners with no candidates are ignored.

It is appreciated that the list structure 240 is operable to store a bypass threshold counter value associated with each memory request. A bypass threshold counter value associated with a given memory request is an acceptable threshold value for the number of times the given memory request is permitted to be bypassed by newer memory requests. At step 320, the counter value associated with a memory request is updated, e.g., incremented/decremented. More particularly, each memory request stored in the list structure 240 has a corresponding counter. The counter associated with a memory request is updated each time that a newer memory request is selected as the output memory request, thereby bypassing the request. In other words, counter values associated with all of the memory requests in the list structure 240 that lie below the selected request are updated, e.g, they are decremented. At step 320, counter values that reach zero are flagged by a bypass flag associated with the request.

Figure 3B:
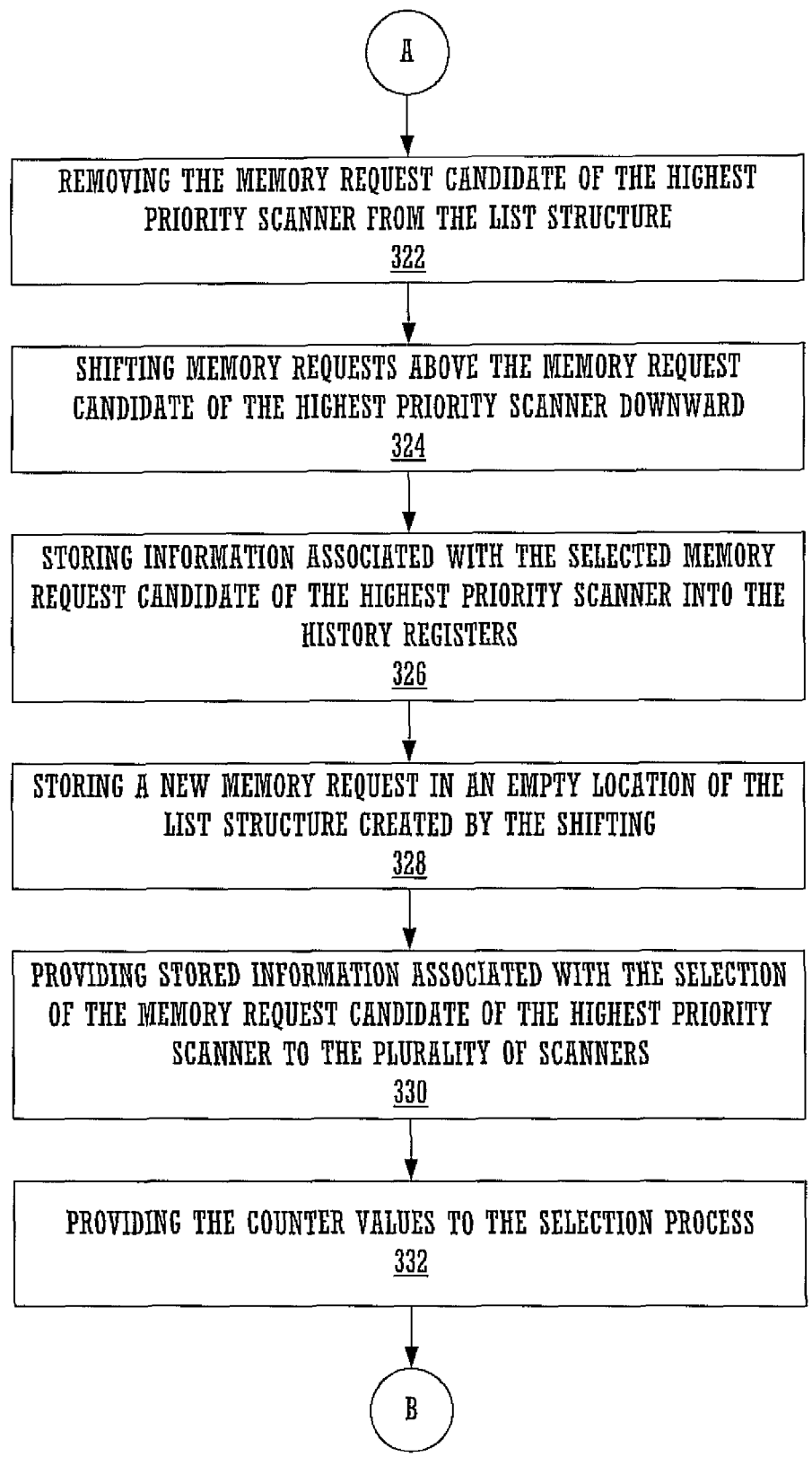

At step 322 of FIG. 3B, the memory request selected as the output memory request is removed from the list structure 240 and its corresponding column information is required from column FIFO 264. It is appreciated that the selected memory request is the memory request candidate of the highest priority scanner that found a candidate. As such, the selected memory request is output 282 from the list structure 240 and is removed from the list structure 240. In this exemplary embodiment, the location of the memory request being outputted is indicated by arrow 258'. A vacancy is created at location 258' in the list structure 240 when the memory request is removed from the list structure 240. The output 282 is combined with the output from column FIFO 264 to create the entire request and this information is fed down to the DRAM memory subsystem.

At step 324, memory requests that lie within positions above the location 258' of the removed memory request are shifted downward. As a result, the vacancy created by the removal can be filled with other memory requests while maintaining relative arrival time of the stored memory requests from the bottom up.

At step 326, information associated with the removed memory request 282 is stored in the history register 270. In other words, the history register 270 stores information regarding the history of the latest memory request selections. For instance, row, direction, bank information, etc., of the selected request is maintained in history register 270.

The shifting at step 324 creates a vacancy at the top of the list structure 240. As such, the list structure 240 may now receive more memory requests from the arbiters in order to fill in that vacancy.

At step 330, the stored information from the history register 270 is fed back to the scanners for the next cycle. As such, during the next scan, the scanners may consider flags that are based on the history of the memory request selections made in order to select the next memory request. For example, the stored information may be associated with programmable rules of the scanners such as setting flags for same direction, same row, same bank, the least used bank, etc.

At step 332, the information within the bypass counters associated with the memory requests is provided to the selection process. In one exemplary embodiment, the information within the bypass counters is provided to the scanners for use during their next scan. For example, the information stored in the counters may indicate to the scanners that a given memory request has not been selected and bypassed for more than threshold allows. Each stored request has its own bypass threshold. A bypass flag becomes set for any request having been bypassed over its threshold.

Figure 4:
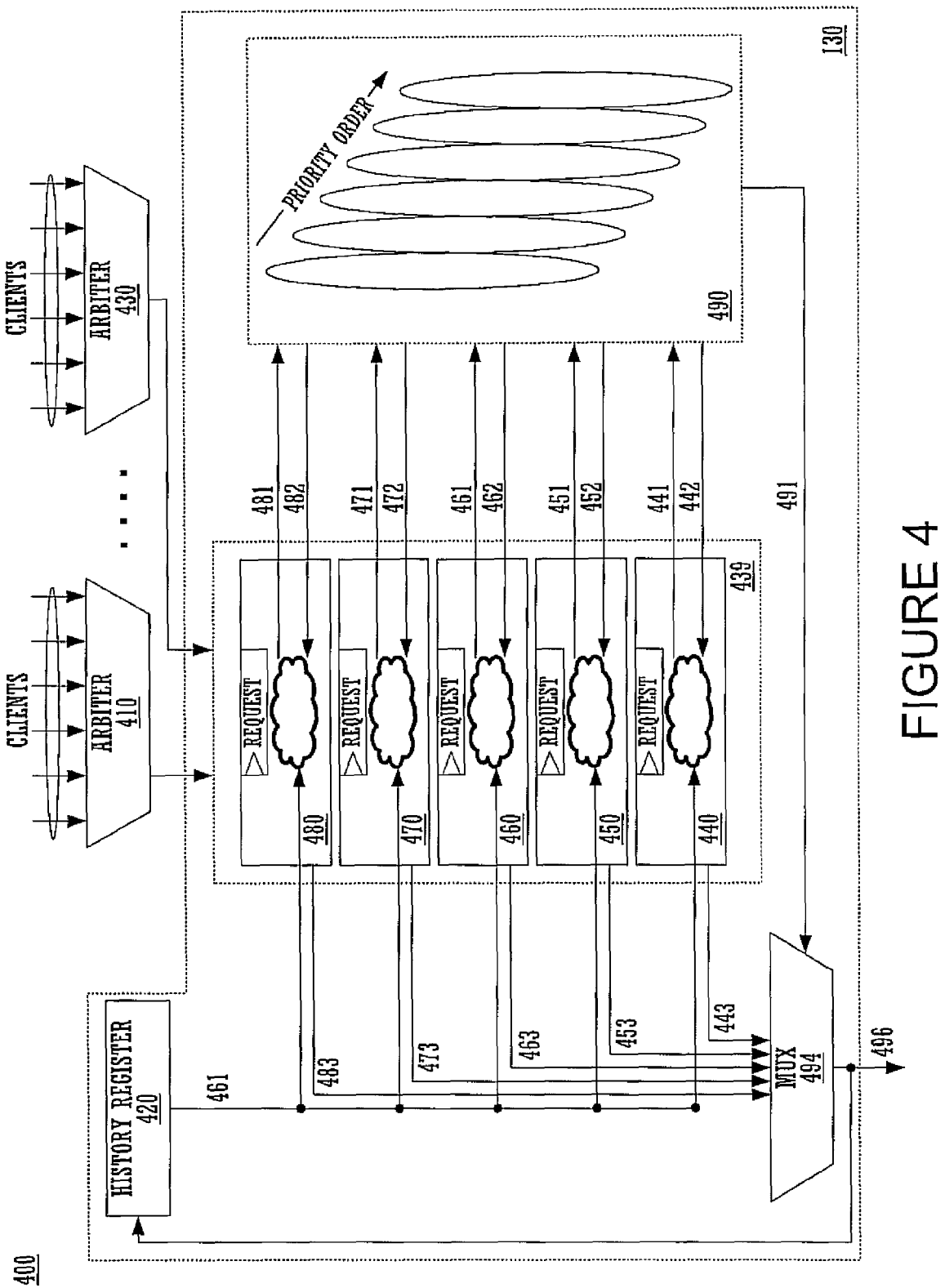
FIG. 4 shows a time ordered list scheduler for selecting memory requests in accordance with one embodiment of the present invention.

Referring now to FIG. 4, the time ordered list scheduler for selecting memory requests in accordance with one embodiment of the present invention is shown. A system 400 includes a plurality of arbiters 410 and 430. Arbiters 410 and 430 are each coupled to multiple clients and operate substantially similar to arbiters 210, 220, and 230, as presented above.

Memory requests transmitted by the arbiters 410 and 430 are stored in locations 440, 450, 460, 470, and 480 of the list structure 439. It is appreciated that the stored information may be only a portion of the memory requests, as discussed above with respect to FIGS. 3A and 3B. The list structure 439 operates substantially similar to that of list structure 240, as presented above. As such, the list structure 439 stores the received memory requests from a bottom most vacant location upwards to preserve relative time of arrival information.

The list structure 439 is coupled to a plurality of programmable and prioritized scanners 490. The scanners are prioritized with respect to one another. The scanners 490 simultaneously scan the list structure 439 from the oldest request to the newest request, e.g., from bottom up. For example, the scanners 490 each receive a plurality of computed flags associated with each of the memory requests, e.g., 441, 451, 461, 471, and 481. The flags may include information such as if the request has not been selected (bypassed) over a threshold number of times. The flags may further include information regarding prior memory request selection as it pertains to the characteristics of the request, such as the least recently used bank, whether the request matches the currently opened row, the last direction of read/write, etc.

The scanners 490 operate substantially similar to scanners 252, 254, and 256, as presented above. Each scanner within the plurality of scanners 490 determines whether a memory request match is found in accordance with its programming. It is appreciated that each scanner has a set of programmable rules associated therewith. The programmable rules are substantially similar to those discussed with respect to FIG. 2. Thus, a rule or a combination thereof may be constructed for each scanner. In the embodiment described with respect to FIG. 4, the programmable rules may be a bit mask indicating which flags of the memory requests the scanner is programmed to recognize. In accordance with one embodiment, all selected flags need to be present for the scanner to find a match. In other embodiments, the flags may be related by other combinational logic to match.

Table 1 below illustrates an exemplary mask format that may be used to program the scanners. According to this format, a program mask of "100000" indicates that the scanner will find a match for a request from an isochronous client. A program mask of "001000" will match for a request whose direction matches the current direction. A program mask of "000110" will match for a request whose row and bank both match the current direction.

TABLE 1

| | |
|---|---|
| ISO_CLIENT | The flag indicates whether the request is from an isochronous client |
| BYPASS_EXPIRED | The flag indicates whether the bypass limit has been exceeded for the request |
| DIR_MATCH | This flag indicates whether a read/write direction of a memory request is the same as the direction of the previously selected memory request |
| ROW_MATCH | This flag indicates whether a row of a memory request is the same as the row of a previously selected memory request |
| BANK_MATCH | This flag indicates whether a bank of a memory request is the same as the bank of the previously selected memory |
| LRU_MATCH | This flag indicates whether a bank of a memory request is one of N least recently used bank |

As a result, each scanner scans the list structure 439 from the bottom up to determine whether a match exists in accordance with the created rule for each scanner and based on the received flags.

The result of the determination by each scanner is reported, e.g., 442, 452, 462, 472, and 482, to the storage elements 440, 450, 460, 470, and 480 of the list structure 439. For example, memory requests residing in locations 440, 460, 470, and 480 are found as a match by the scanners. In this example, memory request residing in location 470 is found as a match by a scanner with the highest priority.

Memory requests that are found as a match are transmitted, e.g., 443, 453, 463, 473, and 483, from their memory locations in the list structure 439 to a multiplexer 494. A signal, e.g., 491, indicating a memory request candidate residing in location 470 that is associated with the highest priority scanner is also transmitted to the multiplexer 494. The signal 491 causes the memory request residing in location 470 to be selected and output 496 from the multiplexer 494. The memory request residing in location 470 is then removed. The list structure 439 shifts down the memory requests residing above the memory request residing in location 470. In other words, the list structure 439 operates substantially similar to the list structure 240 when a memory request candidate associated with the highest priority scanner is removed.

The output 496 is input to a history register 420. The history register 420 operates substantially similar to that of history register 270, as presented above. For example, the history register 420 may store information regarding the previous memory request selections, e.g., its direction, bank, row, etc. The information within the history register 420 is input to the locations 440, 450, 460, 470, and 480 forming portion of the flags 441, 451, 461, 471, and 481 that are transmitted to the scanners.

Accordingly, the scanners can be programmed to create intuitive programmable methods to achieve a desired tradeoff between latency and bandwidth. Moreover, embodiments, achieve a desired tradeoff with minimal complexity and minimal use of die surface area.

Figure 5:
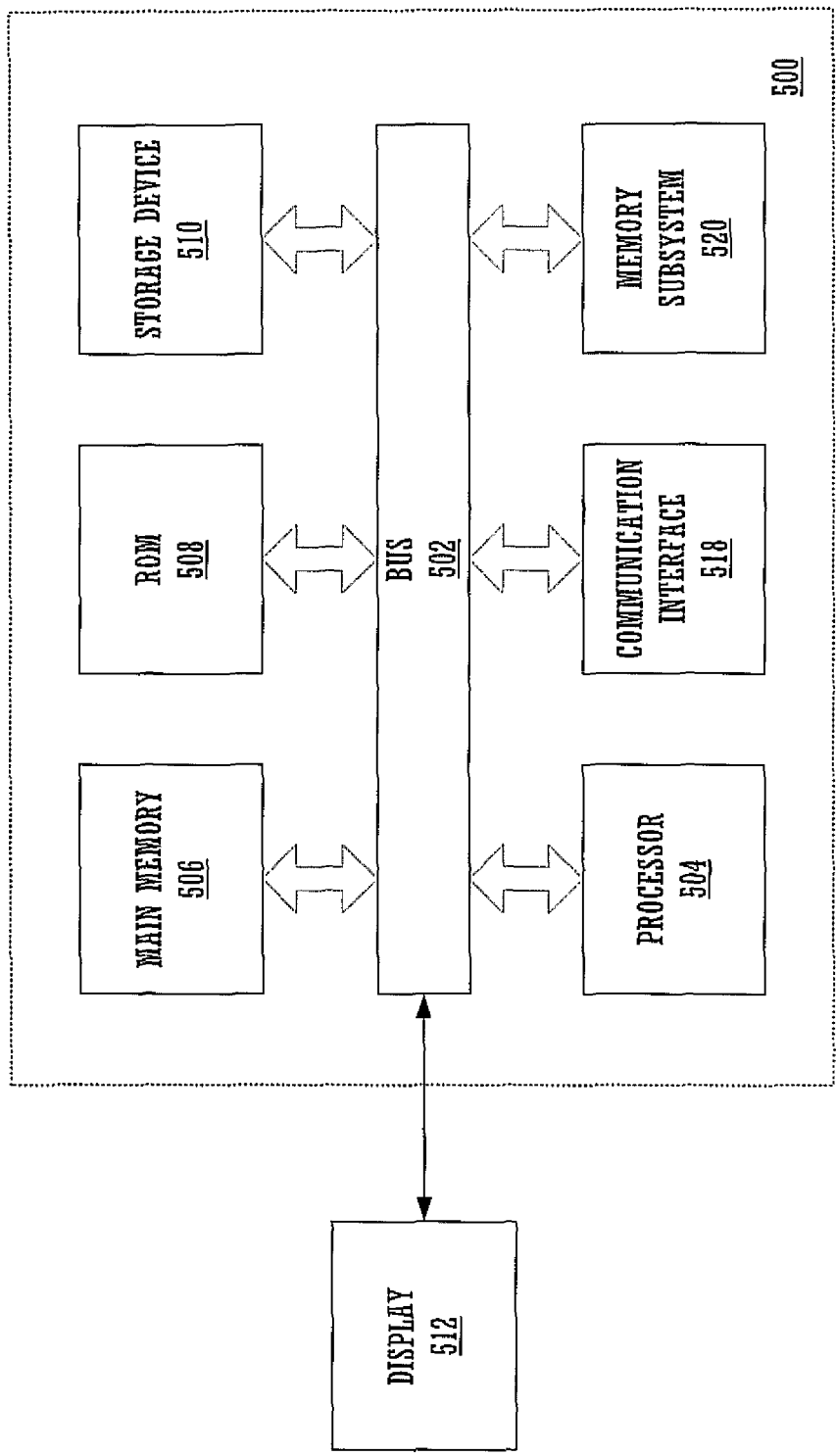
FIG. 5 illustrates a general purpose computer system that may serve as a platform for embodiments of the present invention.

FIG. 5 is a block diagram that illustrates a computer system platform 500 upon which an embodiment of the invention may be implemented. Computer system 500 contains subsystem 520 which includes the scheduler which implements the process for selecting memory requests in accordance with one embodiment of the present invention. The computer system 500 also includes a bus 502 or other communication mechanism for communicating information, and a processor 504 coupled with bus 502 for processing information.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A non-volatile storage device 510, such as a magnetic disk or optical disk, is provided and coupled to bus 502 for storing information and instructions and may store the persistent internal queue. According to one embodiment, the instructions for implementing the virtual device may be stored on any one of the memory components (e.g., RAM, ROM, non-volatile storage device and etc.). Computer system 500 may be coupled via bus 502 to an optional display 512 for displaying information to a computer user.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A system for selecting memory requests comprising:
    a plurality of arbiters each operable to select at least one memory request for transmission from at least one client; and
    a scheduler for receiving and storing a plurality of memory requests from said plurality of arbiters and for selecting a selected memory request for forwarding to a memory system, wherein each of said plurality of memory request comprises a first portion and a second portion, said scheduler comprising:
        a list operable to store respective first portions of said plurality of memory requests received from said plurality of arbiters in a fashion to preserve relative time of arrival of said plurality of memory requests;
        a FIFO operable to store respective second portions of said plurality of memory requests; and
        a plurality of scanners that are prioritized with respect to one another, wherein each scanner is operable to simultaneously scan contents of said list from oldest to newest request and to determine whether a memory request match is found based on associated programmable rules to locate a memory request candidate, wherein a memory request candidate of a highest priority scanner is selected by said scheduler as said selected memory request, wherein said respective first portions are relevant to determinations of memory request matches by said plurality of scanners, and wherein further said respective second portions are irrelevant to said determinations.

2. The system as described in claim 1, wherein said scheduler further comprises:
    a plurality of counters each associated with a respective memory request, wherein each counter is operable to update when a memory request associated therewith is bypassed by a newer selected memory request.

3. The system as described in claim 2, wherein a memory request is flagged by said scheduler if it has been bypassed over its bypass threshold.

4. The system as described in claim 1, wherein said scheduler farther comprises:
a history register operable to store information associated with said selected memory request for use in a subsequent selection, and wherein said information is provided for use by said plurality of scanners.

5. The system as described in claim 1, wherein said programmable rules comprise a client type associated with a request, a bypass flag set for a request, a read/write direction of a request, a row of the request, a bank of the request, and a least used bank.

6. The system as described in claim 1, wherein content associated with said selected memory request is removed from said list structure.

7. The system as described in claim 1, wherein each of said plurality of arbiters comprise a time-oriented ring arbiter.

8. The system as described in claim 1, wherein said scheduler further comprises:
a multiplexer operable to select said memory request candidate of said highest priority scanner as said selected memory request.

9. A method of scheduling memory requests, said method comprising:
receiving a plurality of memory requests from a plurality of arbiters, wherein each of said plurality of memory requests comprises a first portion and a second portion;
storing respective first portions of said plurality of memory requests received from said plurality of arbiters in a list in a fashion to preserve relative time of arrival of said plurality of memory requests;
storing respective second portions of said plurality of memory requests to a FIFO;
simultaneously scanning content of said list from oldest to newest request using a plurality of scanners that are prioritized with respect to one another;
each scanner determining whether a memory request match is found based on associated programmable rules to locate a memory request candidate, wherein said respective first portions pertain to said determining, and wherein further said respective second portions are irrelevant to said determining; and
selecting as a selected memory request a memory request candidate of a highest priority scanner.

10. The method as described in claim 9 further comprising:
updating a counter associated with a memory request when said memory request associated with said counter is bypassed by a newer selected memory request.

11. The method as described in claim 10 further comprising:
setting a bypass flag associated with a memory request if it has been bypassed over its bypass threshold.

12. The method as described in claim 9 further comprising:
retrieving a second portion from of said selected memory request from said FIFO; and
storing information associated with said selected memory request, and wherein said information is provided to said plurality of scanners.

13. The method as described in claim 9 further comprising:
removing a first portion of said selected memory request from said list.

14. The method as described in claim 13 further comprising:
subsequent to said removing, shifting memory requests above said selected memory request, filling a vacancy created by said removing; and
wherein said storing further comprises storing a new memory request in an empty location of said list created by said shifting.

15. A scheduler for receiving and storing a plurality of memory requests from a plurality of arbiters and for selecting a selected memory request for forwarding to a memory system, wherein each of said plurality of memory requests comprises a first portion and a second portion, said scheduler comprising:
a list operable to store respective first portions of said plurality of memory requests received from said plurality of arbiters in a fashion from a bottom most vacant location upwards;
a FIFO operable to store respective second portions of said plurality of memory requests; and
a plurality of scanners that are prioritized with respect to one another, wherein each scanner is operable to simultaneously scan contents of said list from bottom upwards and to determine whether a memory request match is found based on associated programmable rules to locate a memory request candidate, wherein a memory request candidate of a highest priority scanner is selected by said scheduler as said selected memory request, wherein said respective first portions are relevant to determinations of memory request matches by said plurality of scanners, and wherein further said respective second portions are irrelevant to said determinations.

16. The scheduler as described in claim 15 further comprising:
a plurality of counters each associated with a respective memory request, wherein each counter is operable to update when a memory request associated therewith is bypassed by a newer selected memory request.

17. The scheduler as described in claim 16, wherein a memory request associated with a counter reaching a threshold value is flagged by said scheduler.

18. The scheduler as described in claim 15 further comprising:
a history register operable to store information associated with said selected memory request for use in a subsequent selection, and wherein said information is provided for use by said plurality of scanners.

19. The scheduler as described in claim 15, wherein said programmable rules comprise a client type associated with a request, a bypass flag set for a request, a read/write direction of a request, a row of the request, a bank of the request, and a least recently used bank.

20. The scheduler as described in claim 15, wherein content associated with said selected memory request is removed from said list and wherein memory requests located above said selected memory request are shifted downward within said list.

21. The system as described in claim 1, wherein said plurality of scanners comprises a first scanner having a first priority and a second scanner having a second priority, wherein said first priority is higher than said second priority.

* * * * *